(12) United States Patent
Brigotti et al.

(10) Patent No.: US 12,472,225 B2
(45) Date of Patent: Nov. 18, 2025

(54) COMPOUND FOR THE TREATMENT OF THE HEMOLYTIC-UREMIC SYNDROME

(71) Applicant: ALMA MATER STUDIORUM—UNIVERSITA' DI BOLOGNA, Bologna (IT)

(72) Inventors: Maurizio Brigotti, Bologna (IT); Domenica Carnicelli, Bologna (IT); Elisa Porcellini, Forli (IT); Elisabetta Galassi, Bologna (IT)

(73) Assignee: ALMA MATER STUDIORUM—UNIVERSITA' DI BOLOGNA, Bologna (IT)

( * ) Notice: Subject to any disclaimer, the term of this patent is extended or adjusted under 35 U.S.C. 154(b) by 749 days.

(21) Appl. No.: 17/788,688

(22) PCT Filed: Dec. 23, 2020

(86) PCT No.: PCT/IB2020/062405
§ 371 (c)(1),
(2) Date: Jun. 23, 2022

(87) PCT Pub. No.: WO2021/130700
PCT Pub. Date: Jul. 1, 2021

(65) Prior Publication Data
US 2023/0053129 A1 Feb. 16, 2023

(30) Foreign Application Priority Data
Dec. 23, 2019 (IT) .................. 102019000025414

(51) Int. Cl.
*A61K 38/12* (2006.01)
*A61P 13/12* (2006.01)

(52) U.S. Cl.
CPC .............. *A61K 38/12* (2013.01); *A61P 13/12* (2018.01)

(58) Field of Classification Search
None
See application file for complete search history.

(56) References Cited

U.S. PATENT DOCUMENTS

2016/0206684 A1  7/2016  Vaara et al.

FOREIGN PATENT DOCUMENTS

| EP | 3045469 B1 | 11/2017 |
|---|---|---|
| JP | 2011511045 A | 4/2011 |
| JP | 2018505868 A | 3/2018 |
| WO | WO-2008/017734 A1 | 2/2008 |
| WO | WO-2009098357 A1 | 8/2009 |
| WO | WO-2016113470 A1 | 7/2016 |
| WO | WO-2018/172733 A1 | 9/2018 |
| WO | WO-2018162928 A1 | 9/2018 |

OTHER PUBLICATIONS

Stahl et al., "Complement activation on platelet-leukocyte complexes and microparticles in enterohemorrhagic *Escherichia coli*-induced hemolytic uremic syndrome" Thrombosis and Hemostasis Blood, vol. 117, No. 20, pp. 5503-5513, May 19, 2011.

Tarr et al., "Shiga-toxin-producing *Escherichia coli* and haemolytic uraemic syndrome", Lancet, Mar. 19, 2005, vol. 365, No. 9464, p. 1073-1086.

Vaara, Novel derivatives of polymyxins, J. Antimicrob. Chemother., 68(6):1213-9 (2013).

Arfilli et al., A rapid and sensitive method to measure the functional activity of Shiga toxins in human serum, Toxins (Basel), 7(11):4564-76 (2015).

Kaneda et al., Successful Treatment of Enterohemorrhagic *Escherichia coli*-Induced Acute Encephalopathy and Hemolytic-Uremic Syndrome With Polymyxin-B Direct Hemoperfusion, Ther. Apher. Dial., 21(4):419-21 (2017).

V. Arfilli et al., "Shiga toxin 1 and ricin A chain bind to human polymorphonuclear leucocytes through a common receptor" Biochem J. Vol. 432, p. 173-180, (2010).

Bannatyne et al., "Inhibition of the Biologic Effects of Endotoxin on Neutrophils by Polymyxin B Sulfate" The Journal of Infectious Diseases, vol. 136. No. 4, pp. 469-474, (Oct. 1977).

Bauwens et al., "Differential cytotoxic actions of Shiga toxin 1 and Shiga toxin 2 on microvascular and macrovascular endothelial cells" Thromb Haemost, vol. 105, pp. 515-528, (2011).

Brigotti et al., "Identification of TLR4 as the Reception That Recognizes Shiga Toxins in Human Neutrophils" The Journal of Immunology, vol. 191, pp. 4748-4758, (2013).

(Continued)

*Primary Examiner* — Christina Bradley
(74) *Attorney, Agent, or Firm* — MARSHALL, GERSTEIN & BORUN LLP (57) ABSTRACT

A NAB815 compound having the following formula (I), wherein: L is OA, R1 is -Dab, R2 is -Thr, R3 is -DThr, R4 is -Dab, R5 is -Dab, R6 is -DPhe, R7 is -Leu, R8 is -Abu, R9 is -Dab, R10 is -Thr, or a pharmaceutically acceptable salt thereof is provided for a use in the treatment and/or the prevention of the hemolytic-uremic syndrome.

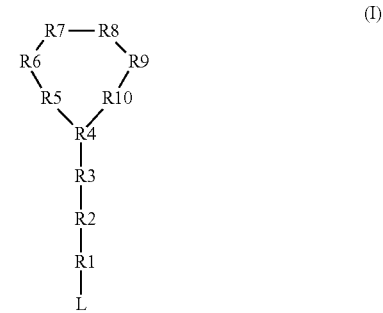

6 Claims, 5 Drawing Sheets
Specification includes a Sequence Listing.

(56) References Cited

OTHER PUBLICATIONS

Brigotti et al., "Particulate Shiga Toxin 2 in Blood is Associated to the Development of Hemolytic Uremic Syndrome in Children" Thrombosis and Haemostasis, vol. 120. pp. 107-120, (2020).

Carnicelli et al., "The Antibiotic Polymizin B Impairs the Interactions between Shiga Toxins and Human Neutrophils" The Journal of Immunology, vol. 196, pp. 1177-1185, (2016).

Friedrich et al., "*Escherichia coli* Harboring Shiga Toxin 2 Gene Variants: Frequency and associations with Clinical Symptoms" The Journal of Infectious Diseases, vol. 185, pp. 74-84, (2002).

Karpman et al., Platelet activation by Shiga toxin and circulatory factors as a pathogenetic mechanism in the hemolytic uremic syndrome Blood, vol. 97, No. 10: pp. 3100-3108, May 15, 2001, (2001).

Macher, et al., "Isolation and Chemical Characterization of Neutral Glycosphingolipids of Human Neutrophils" The Journal of Biological Chemistry, vol. 55, No. 5, pp. 2092-2096, Mar. 10, 1980.

Morrison et al., "Binding of Polymyzin B to the Lipid a Portion of Bacterial Lipopolysaccharides" Immunochemistry, vol. 13. pp. 813-818, (1976).

Paton et la., "Pathogenesis and Diagnosis of Shiga Toxin-Producing *Escherichia coli* Infections" Clinical Microbiology Reviews, vol. 11, No. 3, pp. 450-479, July (1998).

Scheutz et al., "Characteristics of the Enteroaggregative Shiga Toxin/Verotoxin-producing *Escherichia coli* O104:H4 Strain Causing the Outbreak of Haemolytic Uraemic Syndrome in Germeny, May to Jun. 2011" Eurosurveillance, vol. 16, Issue 24. pp. 1-8, Jun. 16, 2011.

Srimal et al., "Titration calorimetric studies to elucidate the specificity of the interactions of polymyzin B with lipopolysaccharides and lipid A" Biochem J. vol. 315, pp. 679-686, (1996).

Stahl et al., "Shiga Toxin and Lipopolysaccharide Induce Platelet-Leukocyte Aggregates and Tissue Factor Release, a Thrombotic Mechanism in Hemolytic Uremic Syndrome" PLoS ONE, vol. 4, Issue 9, e6990 pp. 1-12, Sep. 11, 2009.

Stahl et al., "Complement activation on platelet-leukocyte complexes and microparticles in enterohemorrhagic *Escherichia coli*-induced hemolytic uremic syndrome" Thrombosis and Hemostasis Blood, vol. 117, No. 20, May 19, 2011.

Tazzari et al., "Flow Cytometry Detection of Shiga Toxins in the Blood from Children with Hemolytic Uremic Syndrome" Cytometry Part B (Clinical Cytometry) vol. 61B, pp. 40-44, (2004).

Martii Vaara "Polymyxins and their novel derivative" Current Opinion in Microbiology, vol. 13, pp. 574-581, (2010).

Vaara et al., "Novel Polymyxin Derivatives Carrying Only Three Positive Charges Are Effective Antibacterial Agents" Antimicrobial Agents and Chemotherapy, vol. 52, No. 9, pp. 3229-3236, Sep. (2008).

Vaara et al., "A Novel Polymyxin Derivative that Lacks the Fatty Acid Tail and Carries Only Three Positive Charges Has Strong Synergism with Agents Excluded by the Intact Outer Membrane" Antimicrobial Agents and Chemotherapy, vol. 54, No. 8, pp. 3341-3346, Aug. (2010).

Vaara et al., "Antimicrobial activity of the novel polymyxin derivative NAB739 tested against Gram-negative pathogens" J Antimicrob Chemother, vol. 68, pp. 636-639, (2013).

Van Setten et al., "Effects of Verocytotoxin-1 on Nonadherent Human Monocytes: Binding Characteristics, Protein Synthesis, and Induction of Cytokine Release" Blood, vol. 88, No. 1, pp. 174-183, Jul. 1, 1996.

Wurzner et al.,. "Treatment of Enterohemorrhagic *Escherichia coli*-Induced Hemolytic Uremic Syndrome (eHUS)" Seminars in Thrombosis & Hemostais, vol. 40, No. 4, pp. 508-516, (2014).

Oie S et al, "In Vitro Susceptibility of *Escherichia coli* O157 to Several Antimicrobial Agents", Biological & Pharmaceutical Bulletin, Pharmaceutical Society Of Japan, Tokyo, JP, vol. 20, No. 5, May 1, 1997, p. 584-585.

Vaara Martti et al, "Structure-activity studies on polymyxin derivatives carrying three positive charges only reveal a new class of compounds with strong antibacterial activity", Peptides, Elsevier, Amsterdam, NL, vol. 91, Mar. 11, 2017, p. 8-12.

Vaara Martti et al, "Polymyxin derivatives NAB739 and NAB815 are more effective than polymyxin B in murine *Escherichia coli* pyelonephritis", Journal of Antimicrobial Chemotherapy., vol. 73, No. 2, Feb. 1, 2018, p. 452-455.

Tarr P I et al, "Shiga-toxin-producing *Escherichia coli* and haemolytic uraemic syndrome", Mar. 19, 2005, vol. 365, No. 9464, p. 1073-1086.

International Search Report and Written Opinion for Corresponding International Application No. PCT/IB2020/062405, mailing date Mar. 11, 2021.

COMPOUND FOR THE TREATMENT OF THE HEMOLYTIC-UREMIC SYNDROME

CROSS-REFERENCE TO RELATED APPLICATIONS

This patent application is a U.S. national phase of International Patent Application No. PCT/IB2020/062405 filed Dec. 23, 2020, which claims the benefit of priority from Italian patent application no. 102019000025414 filed on Dec. 23, 2019, the respective disclosures of which is are each incorporated herein by reference in their entireties.

INCORPORATION BY REFERENCE OF MATERIAL SUBMITTED ELECTRONICALLY

A Sequence Listing, which is a part of the present disclosure, is submitted concurrently with the specification as a text file. The name of the text file containing the Sequence Listing is "PA078292-SequenceListing.txt." The Sequence Listing was created on Jun. 20, 2022, and is 3,686 bytes in size. The subject matter of the Sequence Listing is incorporated by reference herein in its entirety.

TECHNICAL FIELD

The present invention relates to a compound for a use in the treatment and/or in the prevention of the hemolytic-uremic syndrome and/or in the treatment of a mammal having at least one Shiga toxin in the blood. The invention further relates to the use of a compound for manufacturing a pharmaceutical preparation for the treatment and/or the prevention of the hemolytic-uremic syndrome.

BACKGROUND OF THE INVENTION

Shiga toxins are bacterial proteins consisting of a pentamer of B subunits bound in a non-covalent manner to an A subunit, which represents the enzymatically active part (Paton e Paton 1998 Clin. Microbiol. Rev. 11, 450-479). The Shiga toxins produced by bacteria such as *Escherichia coli* and *Shigella* are the crucial pathogenicity factor for the development of the hemolytic-uremic syndrome (HUS) (Tarr et al., 2005 Lancet 365, 1073-1086). The hemolytic-uremic syndrome is a severe consequence of these bacterial infections which affects approximately 10-15% of infected patients, especially children under the age of 3 years (Tarr et al., 2005 Lancet 365, 1073-1086). HUS can manifest itself in the form of isolated cases, micro-epidemics (dozens of patients) (Tarr et al., 2005 Lancet 365, 1073-1086) or macro-epidemics (hundreds/thousands of patients), which is what happened in 2011 in Germany and in other European countries (4000 cases of infection, 800 cases of HUS, 50 deaths) (Scheutz et al., 2011 Euro. Surveill. 16). HUS is characterized by hemolytic anemia, thrombocytopenia and acute renal failure, which manifest themselves approximately one week after the infection, when Shiga toxins get into the circulation. Indeed, the toxins are produced by the bacteria in the intestine and are subsequently released into the bloodstream where they interact with circulating cells (early toxemia) before determining the intoxication of the endothelia of the kidneys and of the brain, as well as of other different renal cells, triggering HUS (late toxemia) (Tarr et al., 2005 Lancet 365, 1073-1086). The target cells express the glycolipid receptor globotriaosylceramide (Gb3Cer), which interacts with the pentamer of B subunits of Shiga toxins (Bauwens et al., 2011 Thromb. Haemost. 105, 515-528). The interaction with the circulating cells during the early toxemia plays a crucial role in the pathogenesis of the syndrome (HUS) and can take place by means of the Gb3Cer expressed on monocytes and platelets (van Setten et al., 1996 Blood 88, 174-183; Karpman et al., 2001 Blood 97, 3100-3108). In 2013 some of the inventors of this patent application identified another cellular receptor involved in the interaction between Shiga toxins and human circulating cells (neutrophils, monocytes and platelets) known as Toll-like receptor 4 (TLR4), which interacts with the A subunit of Shiga toxins (Brigotti et al., 2013 J Immunol. 191, 4748-4758; Arfilli et al., 2010 Biochem. J. 432, 173-180).

In the blood of the patients affected by HUS there are white blood cell/platelet aggregates and extracellular vesicles of approximately 1 μm containing Shiga toxins and other virulence factors involved in the development of HUS (Stahl et al., 2011 Blood 117, 5503-5513; Stahl, et al., 2009 PLoS One 4, e6990). The mechanism of formation both of aggregates and of extracellular vesicles is centred on the multiple interaction of Shiga toxins with monocytes, neutrophils and platelets through the two receptors Gb3Cer and TLR4. The circulating cells are activated after the binding to the toxins and form aggregates and, finally, extracellular vesicles. Monocytes and platelets own both Gb3Cer and TLR4, whereas human neutrophils only express the TLR4 (Macher et al., 1980 J. Biol. Chem. 255, 2092-2096).

Shiga toxin 2 is the variant that is most frequently associated with the development of HUS (Friedrich et al., 2002 J Infect. Diseases 185, 74-84). Shiga toxin 2 associated with extracellular vesicles is present in the patients infected by *E. coli* producing Shiga toxins during the early toxemic phase (before the development of the HUS) (Brigotti et al., 2020 Thrombosis and Haemostasis 120, 107-120). Furthermore, Shiga toxin 2 can be associated with these extracellular vesicles through the A chain binding to the membrane TLR4. This allows the B chain pentamer to be exposed and, hence, the Shiga toxins contained inside the vesicle, as well as other virulence factors, to be directed towards the cells that express Gb3Cer (Brigotti et al., 2020 Thrombosis and Haemostasis 120, 107-120). This form of circulating toxin (Shiga toxin 2 bound to extracellular vesicles by means of the A chain) appears in the blood of the patients the day before the development of HUS, whereas it is absent in the infected patients that do no progress in HUS (Brigotti et al., 2020 Thrombosis and Haemostasis 120, 107-120).

There are no specific treatments for the hemolytic-uremic syndrome: patients are treated with a support therapy (replacement of fluids and electrolytes, hyperhydration, dialysis, blood transfusions) (Würzner et al., 2014 Semin Thromb Hemost. 40, 508-516). Therefore, the use of an inhibitor of the interaction between Shiga toxin 2 and TLR4 would be an innovative treatment in the prevention and healing of HUS caused by bacteria producing Shiga toxins.

Polymyxin B is an antibiotic active against Gram-negative bacteria (Vaara, M. 2010 Curr. Opin. Microbiol. 13, 574-581) and capable of blocking the interaction between a microbial component known as endotoxin (or lipopolysaccharide) and the TLR4 (Morrison et al., 1976. Immunochemistry 13, 813-818; Srimal et al., 1996 Biochem. J. 315, 679-686; Bannatyne et al., 1977 J. Infect. Dis. 136: 469-474). In 2016 polymyxin B proved to be capable of also impairing the Shiga toxin 1/TLR4 and Shiga toxin 2/TLR4 interaction (Carnicelli et al., 2016 J. Immunol. 196, 1177-1185). However, polymyxin B is nephrotoxic and neurotoxic (Vaara, 2013 J. Antimicrob. Chemother. 68: 1213-1219) and effective in blocking satisfactorily the interaction between Shiga toxin 2 and the white blood cells only at high concentrations (μg/ml).

The object of the invention is to provide a compound for a use in the treatment and/or in the prevention of the hemolytic-uremic syndrome and/or in the treatment of a mammal having at least one Shiga toxin in the blood, which at least partially overcomes the drawbacks of the prior art and, at the same time, is easy and economic to be implemented.

A further object of the invention is to provide a use of a compound for manufacturing a pharmaceutical preparation for the treatment and/or the prevention of the hemolytic-uremic syndrome, which at least partially overcomes the drawbacks of the prior art and, at the same time, is easy and economic to be implemented.

SUMMARY

According to the invention there are provided a compound for a use in the treatment and/or in the prevention of the hemolytic-uremic syndrome and/or in the treatment of a mammal having at least one Shiga toxin in the blood and a use of a compound for manufacturing a pharmaceutical preparation for the treatment and/or the prevention of the hemolytic-uremic syndrome according to the appended independent claims and, preferably, according to any one of the claims directly or indirectly depending on the independent claims.

BRIEF DESCRIPTION OF THE FIGURES

The invention will now be described with reference to the accompanying figures, which show some non-limiting embodiments thereof, wherein:

FIG. 6 shows the effects of the presence of Shiga toxins 2 (Stx2a), polymyxin B (PMX), NAB815, contaminating bacterial endotoxin (LPS) on the formation of neutrophil/platelet aggregates in blood samples from a human healthy donor; the ordinate shows the percentage of aggregates relative to the overall population of neutrophils; the different columns (from the left to the right) show the results obtained for a non-treated sample (NT) and for a sample treated with Shiga toxins 2 (Stx2a), Stx2a plus polymyxin B (PMX), Stx2a plus NAB815, contaminating bacterial endotoxin (LPS) and Shiga toxin 2 treated for 30 minutes at 95° C. (Stx2a (T)); the data indicated relate to the means±standard deviation (n=2), *$P<0.05$, **$P<0.01$ (Student test) relative to the control sample with toxin and without other components or treatments;

FIG. 7 shows the effects of the presence of Shiga toxins 2 (Stx2a), polymyxin B (PMX), NAB815, contaminating bacterial endotoxin (LPS) on the formation of monocyte/platelet aggregates in blood samples from a human healthy donor; the ordinate shows the percentage of aggregates relative to the overall population of monocytes; the different columns (from the left to the right) show the results obtained for a non-treated sample (NT) and for a sample treated with Shiga toxins 2 (Stx2a), Stx2a plus polymyxin B (PMX), Stx2a plus NAB815, contaminating bacterial endotoxin (LPS) and Shiga toxin 2 treated for 30 minutes at 95° C. (Stx2a(T)); the data indicated relate to the means±standard deviation (n=2), *$P<0.05$ (Student test) relative to the control sample with toxin and without other components or treatments;

FIG. 8 shows the percentage of neutrophil/platelet aggregates with respect to samples treated with toxin (blood from three different human healthy donors); the ordinate shows the percentage of aggregates relative to the total aggregates obtained by adding the sole Shiga toxin 2 (Stx2a) to the sample; the different columns (from the left to the right) show the results obtained for a sample treated with Shiga toxin 2 (Stx2a), Stx2a plus polymyxin B (PMX), Stx2a plus NAB815, contaminating bacterial endotoxin (LPS) and Shiga toxin 2 treated for 30 minutes at 95° C. (Stx2a(T)); the data indicated relate to the means±standard deviation (n=3); after the incubation of the blood with Shiga toxin 2, the percentage of neutrophil/platelet aggregates over the total population of neutrophils was equal to 67.8%±17.2% (mean±standard deviation, n=3), ***P<0.001 (Student test) relative to the control sample with toxin and without other components or treatments;

FIG. 9 shows the percentage of monocyte/platelets aggregates with respect to samples treated with toxin (blood from three different human healthy donors); the ordinate shows the percentage of aggregates relative to the total aggregates obtained by adding the sole Shiga toxin 2 (Stx2a) to the sample; the different columns (from the left to the right) show the results obtained for a sample treated with Shiga toxin 2 (Stx2a), Stx2a plus polymyxin B (PMX), Stx2a plus NAB815, contaminating bacterial endotoxin (LPS) and Shiga toxin 2 after treatment for 30 minutes at 95° C. (Stx2a(T)); the data indicated relates to the means±standard deviation (n=3); after the incubation of the blood with Shiga toxin 2, the percentage of monocyte/platelet aggregates over the total population of monocytes was equal to 62.5%±10.7% (mean±standard deviation, n=3), ***P<0.001 (Student test) relative to the control sample with toxin and without other components or treatments.

DETAILED DESCRIPTION

In accordance with a first aspect of the invention, there is provided the NAB815 compound (or a pharmaceutically acceptable salt thereof) for the treatment (and/or the prevention) of the hemolytic-uremic syndrome. In particular, the NAB815 compound (or a pharmaceutically acceptable salt thereof) is provided for the treatment (and/or the prevention) of the hemolytic-uremic syndrome of a mammal (more in particular, of a human being).

Alternatively or in addition, the NAB815 (or a pharmaceutically acceptable salt thereof) is provided for the (for a use in the) treatment of a mammal (in particular, a human being) having at least one Shiga toxin (in particular, a Shiga toxin 2) in the blood within the circulatory system of the mammal. Advantageously, though not necessarily, the Shiga toxin (in particular, the Shiga toxin 2) present in the blood within the circulatory system of the mammal (in particular, of the human being) is associated with white blood cells and/or platelets so as to form aggregates and/or extracellular vesicles.

According to some non-limiting embodiments, there is provided a pharmaceutically acceptable salt of the NAB815 compound for the treatment (and/or) the prevention of the hemolytic-uremic syndrome.

Alternatively or in addition, the pharmaceutically acceptable salt of the NAB815 is provided for the (for a use in the) treatment of a mammal (in particular, a human being) having at least one Shiga toxin (in particular, a Shiga toxin 2) in the blood within the circulatory system of the mammal. Advantageously, though not necessarily, the Shiga toxin (in particular, the Shiga toxin 2) present in the blood within the circulatory system of the mammal (in particular, of the human being) is associated with white blood cells and/or platelets so as to form aggregates and/or extracellular vesicles.

The NAB815 has the following formula (I):

$$
\begin{array}{c}
R7 - R8 \\
/ \quad \backslash \\
R6 \quad\quad R9 \\
\backslash \quad / \\
R5 \quad R10 \\
\backslash / \\
R4 \\
| \\
R3 \\
| \\
R2 \\
| \\
R1 \\
| \\
L
\end{array}
\quad (I)
$$

wherein: L is OA, R1 is -Dab, R2 is -Thr, R3 is -DThr, R4 is -Dab, R5 is -Dab, R6 is -DPhe, R7 is -Leu, R8 is -Abu, R9 is -Dab, R10 is -Thr.

More precisely, the sequence R1-R10 represents the sequence Dab-Thr-DThr-cy[Dab-Dab-DPhe-Leu-Abu-Dab-Thr-], namely Sequence NO. 1. In other words, the NAB815 is OA-Dab-Thr-DThr-cy[Dab-Dab-DPhe-Leu-Abu-Dab-Thr-], namely OA-Sequence NO. 1.

It should be pointed out that, in this text, the Dabs of the R1, R5 and R9 of the NAB815 each have a respective positive charge.

More in particular, the NAB815 is typically associated with one or more counterions (for example, the sulphate ion) so as to form a salt (in particular, a pharmaceutically acceptable salt).

The abbreviations used in this text have the following meanings: Dab is α,γ-diamino-n-butyryl (i.e. 2,4-diaminobutyryl); Abu is 2-aminobutyryle; Thr is L-threonine; DThr is D-threonine; DPhe is D-phenylalanine; Leu is L-leucine; DSer is D-serine; OA is octanoyl; MOA is methyloctanoyl; MHA is methylheptanoyl; Ac is acyl; and cy[ . . . ] indicates a cycle consisting of the components indicated in the square brackets and in which the first and the last components are bound.

In this text, "pharmaceutically acceptable salt" means a salt which maintains the biological properties of the original compound. Non-limiting examples of methods for the preparation of these salts include the following methods: addition of inorganic acids (for example, hydrochloric acid, hydrobromic acid, sulphuric acid, phosphoric acid and the like) or organic acids (for example, acetic acid, oxalic acid, maleic acid, methanesulfonic acid, salicylic acid, succinic acid, citric acid and the like) to a free base of the original compound; replacement of an acid proton of the original compound with a metal cation (for example, a cation of an alkali metal or of an aluminium or the like); transfer of an acid proton of the original compound to an organic base (for example, dimethylamine, triethylamine and the like) and coordination with said organic base.

Specific examples of pharmaceutically acceptable salts are acid addition salts obtained from the use of non-toxic acids, such as hydrochloric acid, nitric acid, sulphuric acid, phosphoric acid, oxalic acid, fumaric acid, maleic acid, succinic acid, acetic acid, citric acid, ascorbic acid, maleic acid, benzoic acid, tartaric acid, carbonic acid and the like. An acid typically used for the formation of the pharmaceutically acceptable salt is sulphuric acid.

In this text, "prodrug" means an agent which, in vivo, is converted into a pharmacologically active substance. A prodrug can have some advantages compared to the corresponding pharmacologically active substance. For instance, it can be easier to be administered to patients and/or have a greater solubility and/or a better ability to go through cellular membranes. When a reference is made to NAB815, possible prodrugs are also meant to be comprised.

The NAB815 can be synthesized according to what disclosed in example 1 of patent EP3045469.

The NAB815 (or a pharmaceutically acceptable salt thereof) has proved to have a cytotoxicity, in particular for human renal tubule cells ($IC_{50}$ 334 µg/ml), approximately 20 times lower than polymyxin B ($IC_{50}$ 18 µg/ml) (Vaara et al. 2017 Peptides 91, 8-12).

Therefore, the use of NAB815 leads to a decrease in the risk of nephrotoxicity caused by drug.

The structure of the NAB815 substantially differs from the one of polymyxin B (pentacationic cyclic lipodecapeptides, 3 charges in the cyclic portion, 2 in the linear portion, table 1) because of the reduction of the positive charges responsible for the toxicity from 5 to 3, 2 of them being in the cyclic portion of the molecule, unlike other tricationic cyclic lipononapeptide derivatives with 3 positive charges in the cyclic portion: NAB7061 (Vaara et al. 2008 Antimicrob. Agents Chemother. 52:3229-3236) and NAB741 (Vaara et al. 2010 Antimicrob Agents Chemother. 54: 3341-3346) (table 1).

Table 1 below indicates the meaning of the different parts of formula (I) for the aforesaid compounds.

Therefore, the NAB815 is effective in exceptionally small quantities.

This leads to the further advantage that the NAB815 can be used with a low risk of it releasing further Shiga toxins in the blood of the patient.

In this regard, it should be reminded that antibiotic therapy in patients infected by bacteria producing Shiga toxins is not usually recommended for the treatment/prevention of the hemolytic-uremic syndrome (Würzner et al. 2014 Semin Thromb Hemost. 40, 508-516). This is due to the fact that the antibiotics, by attacking the bacteria, can determine an increase in the concentration of Shiga toxins in the patient's blood (these Shiga toxins are supposedly released by the bacteria attacked by the antibiotics).

In other words, the NAB815, since it can operate in very small quantities, surprisingly manages to overcome the technical prejudice according to which antibiotics have been considered to be harmful (worsening) for patients infected by bacteria producing Shiga toxins or affected by hemolytic-uremic syndrome.

In view of the above, in this text, when a reference is made to the prevention (and possibly the treatment) of the hemolytic-uremic syndrome, it is not meant the antibiotic action of the NAB815 against bacteria producing Shiga toxins.

In accordance with a further aspect of the invention, there is provided a use of the NAB815 compound (or a pharmaceutically acceptable salt thereof) for manufacturing a phar-

TABLE 1

| | L | R1 | R2 | R3 | R4 | R5 | R6 | R7 | R8 | R9 | R10 |
|---|---|---|---|---|---|---|---|---|---|---|---|
| Polymyxin B | MOA/MHA | -Dab+ | -Thr | -Dab+ | -cy[Dab | -Dab+ | -DPhe | -Leu | -Dab+ | -Dab+ | -Thr] |
| NAB815 | OA | -Dab+ | -Thr | -DThr | -cy[Dab | -Dab+ | -DPhe | -Leu | -Abu | -Dab+ | -Thr] |
| NAB7061 | OA | — | -Thr | -Abu | -cy[Dab | -Dab+ | -DPhe | -Leu | -Dab+ | -Dab+ | -Thr] |
| NAB741 | Ac | — | -Thr | -DSer | -cy[Dab | -Dab+ | -DPhe | -Leu | -Dab+ | -Dab+ | -Thr] |

More precisely, the sequence R4-R10 for polymyxin B, for NAB7061 and for NAB741 represents the sequence cy[Dab-Dab-DPhe-Leu-Dab-Dab-Thr-], i.e. a Sequence NO. 2. Therefore, in other words: polymyxin B is MOA/MHA-Dab-Thr-Dab-cy[Dab-Dab-DPhe-Leu-Dab-Dab-Thr-], i.e. MOA/MHA-Dab-Thr-Dab-Sequence NO. 2; NAB7061 is OA-Thr-Abu-cy[Dab-Dab-DPhe-Leu-Dab-Dab-Thr-], i.e. OA-Thr-Abu-Sequence NO. 2; NAB741 is Ac-Thr-DSer-cy[Dab-Dab-DPhe-Leu-Dab-Dab-Thr-], e.i. Ac-Thr-DSer-Sequence NO. 2.

It should be pointed out that, in the structures indicated above (i.e. in formula (I)), the Dabs (with the exception of the Dab of R4, i.e. the Dab determining the formation of the cyclic portion) have a respective positive charge each.

More in particular, polymyxin B, NAB7061 and NAB741 are typically associated with one or more counterions (for example, the sulphate ion) so as to form a salt (in particular, a pharmaceutically acceptable salt).

It should be pointed out that experiments have shown that the NAB815 is surprisingly more active than polymyxin B, NAB7061 and NAB741 for the treatment and/or the prevention of the hemolytic-uremic syndrome. In particular, the NAB815 has proved to be surprisingly and significantly more active in inhibiting the interaction of the Shiga toxin 2 with the TLR4 in human circulating cells (human neutrophil—FIGS. 1-4); directly interact with the Shiga toxin 2; be surprisingly and significantly more active in avoiding the consequences of the interaction between the Shiga toxin 2 and the human circulating cells (blocking the formation of monocyte/platelet and neutrophil/platelet aggregates—FIGS. 6-9).

maceutical preparation for the treatment (and/or the prevention) of the hemolytic-uremic syndrome. Alternatively or in addition, there is provided a use of the NAB815 compound (or a pharmaceutically acceptable salt thereof) for manufacturing a pharmaceutical preparation for the treatment of a mammal (in particular, a human being) having at least one Shiga toxin (in particular, a Shiga toxin 2) in the blood within the circulatory system (of the mammal—in particular, of the human being). In particular, the Shiga toxin (in particular, the Shiga toxin 2) present in the blood within the circulatory system is associated with white blood cells and/or platelets so as to form aggregates and/or extracellular vesicles in the blood within the circulatory system of the mammal (more precisely, of the human being).

In accordance with a further aspect of the invention, there is provided a pharmaceutical preparation comprising a compound having general formula (I), as defined above, or a pharmaceutically acceptable salt thereof (and, in particular, a pharmaceutically acceptable excipient and/or diluent).

Advantageously, though not necessarily, the pharmaceutical preparation comprises a pharmaceutically acceptable salt of the NAB815.

The pharmaceutical preparation (comprising the NAB815), according to some non-limiting embodiment, is for administration through a route chosen in the group consisting of: parenteral route, enteral route, topical route (or a combination thereof).

Advantageously, though not necessarily, the pharmaceutical preparation further comprises one or more pharmaceutically acceptable excipients.

For example, the pharmaceutical preparation can be a tablet and comprise, as pharmaceutically acceptable excipient, fructose for food use.

In some non-limiting cases, the pharmaceutical preparation (comprising the NAB815) is for subcutaneous administration, intravenous administration, intra-articular administration, intrathecal administration, intramuscular administration, intraperitoneal administration, intradermal administration (intradermal injections), transdermal administration, rectal administration, buccal administration, oromucosal administration, nasal administration, ocular administration, oral administration, inhalation and/or implant.

Advantageously, though not necessarily, the pharmaceutical preparation (comprising the NAB815) is for parenteral administration by injection or continuous administration (according to what is known for other similar compounds). Injection formulations can be in the form of unitary doses, for example in bulbs or multi-dose containers containing preservatives. The pharmaceutical preparation can be in the form of suspension, in watery or oily liquids, and can contain elements of the formulation as dispersion and stabilization agents. Alternatively, the NAB815 can be in powder and be dissolved, right before use, in a liquid suited for the purpose, for example sterilized water.

Advantageously, though not necessarily, the pharmaceutical preparation (comprising the NAB815) is administered through topical administration (on the skin) of the composition and/or through oral administration. For example, in these cases (oral administration), according to some variants, the composition is in a liquid watery form (solution, syrup, drops, etc.) or in a solid form (tablets, pills, capsules, etc.).

For oral administrations, the pharmaceutical preparation can be, for example, in the form of tablets or capsules prepared by means of known methods with pharmaceutically acceptable excipients as binding agents (e.g. pregelatinized corn starch, polyvinylpyrrolidone or methylcellulose), fillers (e.g. lactose, microcrystalline cellulose or calcium hydrogen phosphate), additives (e.g. magnesium stearate, talc, silica), disintegrating agents (e.g. potato starch) and/or lubricating agents (e.g. sodium lauryl sulfate). The tablets can be coated by means of known methods. Liquid preparations for oral administrations can have, for example, the form of solutions, syrups or suspensions or they can be in the form of a dry product which can be dissolved in water or in another liquid before use. These preparations can be prepared, in known ways, with pharmaceutically acceptable excipients as suspending agents (e.g. sorbitol, cellulose derivatives, edible hydrogenated fats), emulsifiers (e.g. lecithin or acacia), non-watery liquids (e.g. almond oil, oil esters, ethyl alcohol or fractionated vegetable oils) and/or preservatives (e.g. methyl- or propyl p-hydroxybenzoates, sorbic acid or ascorbic acid). The preparations can also contain, in suitable cases, buffer salts, colouring, aromatic and/or sweetening agents.

Oral administration preparations can be formulated in a known manner, so as to release the active compound in a controlled manner.

In some non-limiting cases, the pharmaceutical preparation (comprising the NAB815) can be designed (in a known manner) to be administered through rectal administrations, such as suppositories or bulb syringes, for example containing known suppository excipients, such as cocoa butter or other glycerides.

In addition or alternatively, the pharmaceutical preparation (comprising the NAB815) can be formulated (in a known manner) as a prolonged-release composition. These prolonged-release compositions can be administered, for example, by means of an implant (for example a subcutaneous or intramuscular implant) or by means of an intramuscular injection. Therefore, for example, the pharmaceutical preparation (comprising the NAB815) comprises suitable polymer and/or hydrophobic materials (e.g. an emulsion or an oil) and/or ion-exchange resins and/or derivatives (of the NAB815) which are relatively scarcely soluble, such as relatively scarcely soluble salts.

For intranasal administrations, the pharmaceutical preparation can be formulated for administrations through a (known) device, for example in powder for a suitable transporter.

According to some embodiments, the pharmaceutical preparation only comprises NAB815 (in particular, a salt thereof) as active compound; alternatively, it comprises one or more further active ingredients, in particular an antibacterial agent.

These further active ingredients can be administered simultaneously or in sequence in any order with the NAB815.

The NAB815 can be formulated in a suitable preparation; suitable administration forms comprise, for example, solutions, dispersions, suspensions, powders, capsules, tablets, pills, controlled-release capsules, controlled-release tablets and controlled-release pills.

In accordance with a further aspect of the invention, there is provided a method for the treatment and/or the prevention of the hemolytic-uremic syndrome in a mammal. The method comprises administering a dose of NAB815 (or of a pharmaceutically acceptable salt thereof) to the mammal.

In addition or alternatively, there is provided a method for the treatment of a mammal (in particular, a human being) having at least one Shiga toxin 2 associated with white blood cells and/or platelets so as to form aggregates and/or extracellular vesicles in the blood within the circulatory system of the mammal (in particular, of the human being). The method comprises administering a dose of NAB815 (or of a pharmaceutically acceptable salt thereof) to the mammal.

Examples of mammal that can be treated are: farm animals, such as cows, pigs, sheep, goats and horses; pets, such as cats and dogs; lab animals, such as guinea pigs, rabbits, mice and rats; human beings.

The NAB815 can be administered (to mammals—in particular, to human beings) in different ways, for example by parenteral route, topical route and/or enteral route.

In some specific cases, the NAB815 can be administered through subcutaneous administration, intravenous administration, intra-articular administration, intrathecal administration, intramuscular administration, intraperitoneal administration and intradermal administration as well as through transdermal administration, rectal administration, buccal administration, oromucosal administration, nasal administration, ocular administration, through inhalation and through oral administration.

The dosage of the NAB815 depends on the age and conditions of the patient; therefore, the dosage should be decided case by case by the physician. The dosage also depends on the administration method. Usable doses can range, for example, from 0.1 mg/Kg to 300 mg/Kg (in particular, from 0.1 mg/Kg to 100 mg/Kg; more in particular, from 0.1 mg/Kg to 30 mg/Kg), relative to the body weight, per day.

The NAB815 can be administered in combination with one or more suitable therapeutic agents formulated in a known and usable manner.

According to a further aspect of the invention, there is provided a method for the treatment and/or the prevention of the hemolytic-uremic syndrome in a mammal. In particular, the method comprises administering a dose of NAB815 or of a pharmaceutically acceptable salt thereof to the mammal.

In addition or alternatively, there is provided a method for the treatment of a mammal (in particular, a human being) having at least one Shiga toxin 2 associated with white blood cells and/or platelets so as to form aggregates and/or extracellular vesicles in the blood within the circulatory system of the being; the method comprises administering a dose of NAB815 or of a pharmaceutically acceptable salt thereof to the human being.

Unless explicitly indicated otherwise, the content of the references (articles, books, patent applications, etc.) mentioned above is entirely quoted herein. In particular, the above-mentioned references are herein incorporated by reference.

Further features of the invention will be best understood upon perusal of the following description of a merely explanatory and non-limiting example.

Example 1

This example shows that the NAB815 is effective at much smaller concentrations than polymyxin B in preventing the binding of Shiga toxin 2 to circulating cells (human neutrophils) expressing the TLR4 and in stopping the following functional consequences implied in the development of the hemolytic-uremic syndrome.

The binding of Shiga toxin 2 to the neutrophil was measured by means of indirect fluorescence-based flow cytometry after incubation of these cells, isolated from human blood of three different donors, with the toxin (FIGS. 3 and 4); the results are expressed as percentage of toxin bound to the neutrophils. In brief, human neutrophils (99.7% of purity) isolated in sterile conditions with low contamination of bacterial endotoxin were obtained from buffy coats of healthy donors after centrifugation on Ficoll-Paque followed by sedimentation with dextran, hypotonic lysis of the erythrocytes and positive removal of contaminating cells by means of EasySep Human Neutrophil Enrichment Kit (Stemcell Technologies, Vancouver, BC, Canada), as described above (Brigotti et al., 2013 J Immunol. 191, 4748-4758). In the experiments for the binding of Shiga toxin 2 to the neutrophils, we used Eppendorf tubes pretreated with PBS (phosphate buffered saline) containing bovine serum albumin (BSA) 1% with low endotoxin content 1 Eu/mg Sigma) in order to avoid non-specific losses of toxin (Brigotti et al., 2013 J Immunol. 191, 4748-4758). The neutrophils ($5 \times 10^5$/ml) were incubated 90 min at 37° C. with the Shiga toxin 2 (60 nM) in 250 µl of PBS-BSA in the presence and in the absence of different concentrations of the derivatives of polymyxin B called NAB741, NAB7061 and NAB815 (re-suspended in PBS at the concentration 10 mg/ml and diluted in the same buffer). After the incubation, the cells were sedimented by centrifugation at 200×g for 5 min and washed three times with 100 µl of the same buffer at 37° C. The determination of the amount of Shiga toxin 2 bound to the neutrophils was carried out through incubation with a mouse monoclonal antitoxin antibody (IgG) in the presence of human serum to avoid non-specific binding, washing with PBS and subsequent addition of an anti-murine IgG fluorescent sheep antibody (FITC). The fluorescence-based flow cytometry analysis allows for a detection of the fluorescence associated to neutrophils (Tazzari et al., 2004 Cytometry B Clin. Cytom. 61, 40-44). The MCV parameter (mean channel value of fluorescence) of the obtained fluorescence histograms was chosen for the quantitative determination of the binding of the Shiga toxin 2 to the neutrophil.

Figure 1:
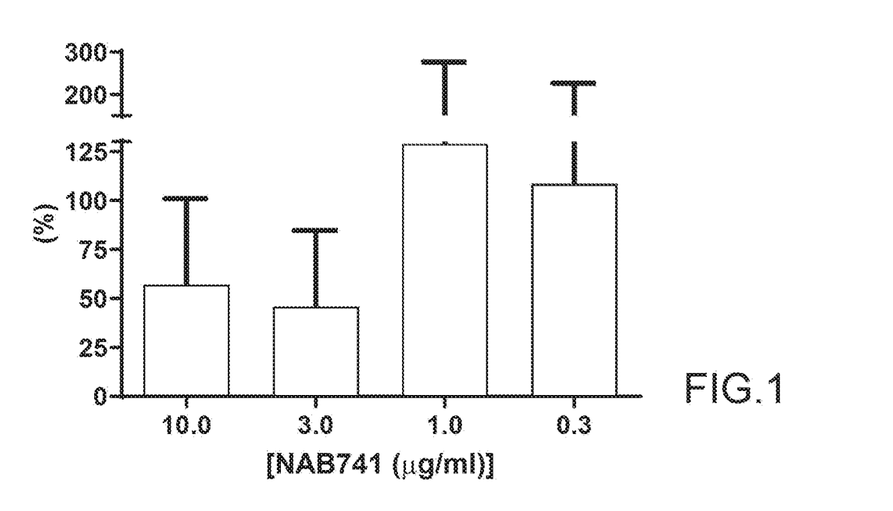
FIG. 1 shows the effect of NAB741 (derivative of polymyxin B) on the binding of Shiga toxin 2 to the human neutrophil; the data (mean±standard deviation; n=3) represent the percentage of binding relative to the value obtained in the presence of toxin without other compounds, such as for example polymyxin B and derivatives thereof (MCV=2.4±0.3, mean±standard deviation; n=3); the ordinate shows the percentage of Shiga toxin 2 bound to the neutrophils; the abscissa shows the concentration of NAB741 (μg/ml) used.
Figure 2:
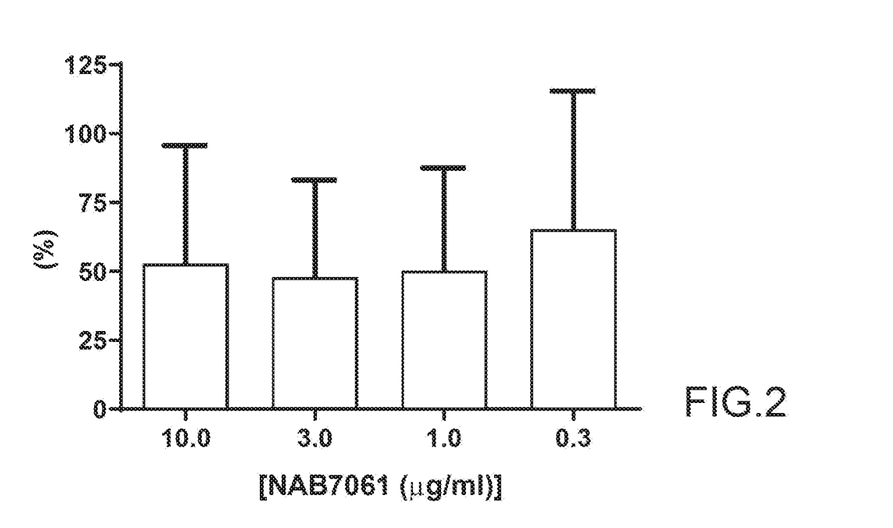
FIG. 2 shows the effect of NAB7061 (derivative of polymyxin B) on the binding of Shiga toxin 2 to the human neutrophil; the data represent the percentage of binding relative to the value obtained in the presence of toxin without other compounds, such as for example polymyxin B and derivatives thereof (MCV=2.4±0.3, mean±standard deviation; n=3); the ordinate shows the percentage of Shiga toxin 2 bound to the neutrophils; the abscissa shows the concentration of NAB7061 (μg/ml) used.
Figure 3:
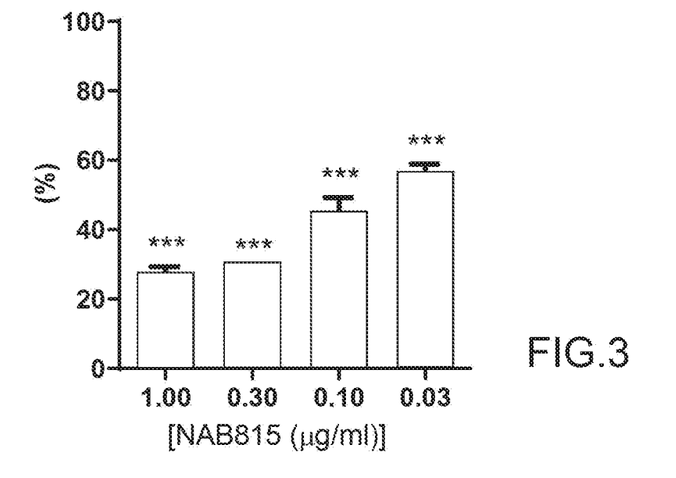
FIG. 3 shows the effect of NAB815 (derivative of polymyxin B) on the binding of Shiga toxin 2 to the human neutrophil; the data represent the percentage of binding relative to the value obtained in the presence of toxin without other compounds, such as for example polymyxin B and derivatives thereof (MCV=4.3±0.9, mean±standard deviation; n=3); the ordinate shows the percentage of Shiga toxin 2 bound to the neutrophils; the abscissa shows the concentration of NAB815 (μg/ml) used; ***$P<0.001$ (Student test) relative to the control sample with toxin and without NAB815.
Figure 4:
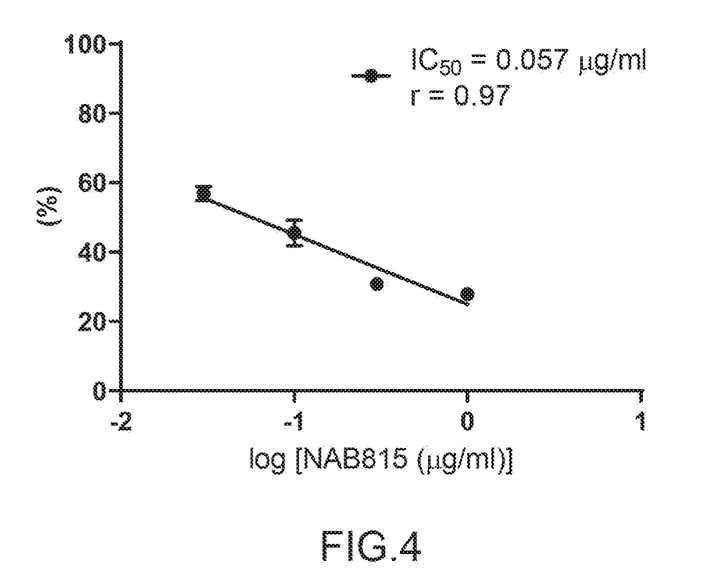
FIG. 4 shows the percentage of Shiga toxin 2 bound to the human neutrophil as a function of the log base 10 of the concentration of NAB815; the ordinate shows the percentage of Shiga toxin 2 bound to the neutrophils relative to the value obtained in the presence of Shiga toxin 2 without NAB815; the abscissa shows the log base 10 of the concentration of NAB815 (μg/ml) used; the $IC_{50}$ was calculated by the least squares method applying the linear regression between the percentage of Shiga toxin 2 and the logarithm of the concentration of NAB815; the Pearson coefficient (r) was used to assess the correlation between the variables.

The effect of other two low-toxicity derivatives of polymyxin B was compared with the one of NAB815 (always following the procedure described above). Both NAB741 and NAB7061 proved to be scarcely effective as inhibitors of the binding of Shiga toxin 2 to the neutrophil, as indicated by the non-significant results and by the fact that the effect is not dose-dependent (FIGS. 1 and 2). On the contrary, NAB815 proved to be a strong inhibitor of the neutrophil/Shiga toxin 2 interaction, thus determining reproducible results with a marked dose-dependent relationship even at concentrations below 1 µg/ml (FIGS. 3 and 4). Hence, the NAB815 is a surprisingly good inhibitor of the interaction between Shiga toxin 2 and TLR4. Indeed, the $IC_{50}$ (concentration determining a 50% inhibition) calculated by these experiments for the NAB815 (0.057 µg/ml) surprisingly is approximately 60 times lower than that obtained with polymyxin B (3.5 µg/ml) in similar conditions (Carnicelli et al. 2016 J. Immunol. 196, 1177-1185). It should be pointed out that the binding of the Shiga toxin 2 to the neutrophils, obtained by incubating the cells with 60 nM toxin, is inhibited by 50% in the presence of 43 nM NAB815 (0.057 µg/ml), this indicates a 1:1 stoichiometric ratio between Shiga toxin 2 and NAB815. The result is innovative and surprising because a specific non-toxic derivative (NAB815) of polymyxin B proved to be effective at much lower concentrations than the parent compound, whereas other two scarcely toxic derivatives of the same antibiotic (NAB741, NAB7061) did not lead to any effect.

Example 2

Figure 5:
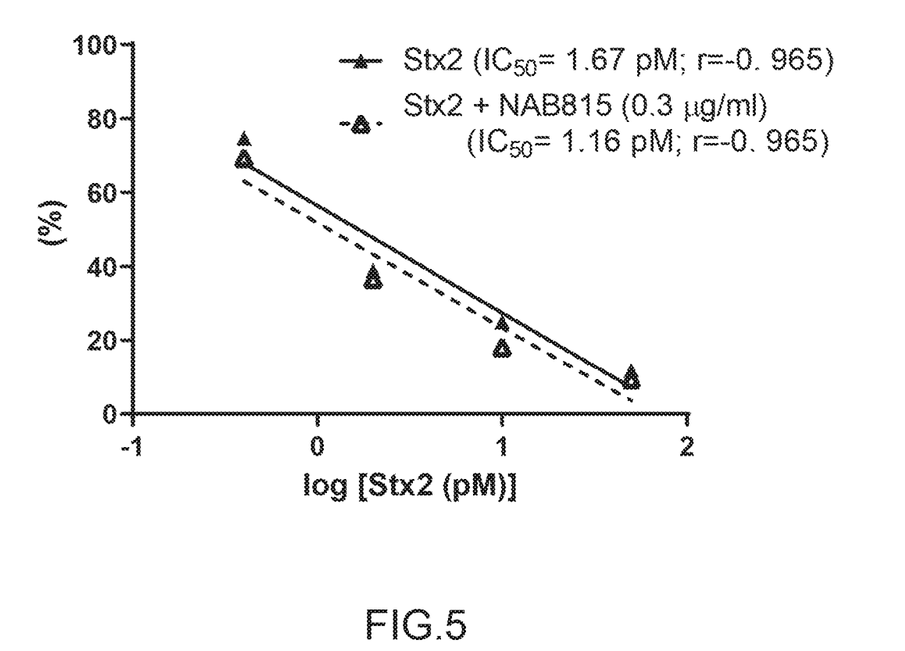
FIG. 5 shows the effect of the presence of the NAB815 relative to the interaction between Raji cells and Shiga toxin 2 (Stx2); the continuous line and the dotted line indicate the extent of the protein synthesis in Raji cells treated with different concentrations of Shiga toxin 2 in the absence and in presence of NAB815, respectively; the ordinate shows the percentages of protein synthesis obtained in Raji cells with different concentrations of Shiga toxin 2 relative to the control without toxin; the abscissa shows the log base 10 of the concentrations (pM—picomolar) of Shiga toxin 2 used.

This example showed that NAB815 directly interacts with the Shiga toxin 2. In order to give indirect evidence of the NAB815/Shiga toxin 2 interaction we used the natural fluorescence of the Shiga toxin 2 due to the 12 tryptophan residues present in the compound. By exciting the toxin (0.5 µM in 300 µl of PBS) at 295 nm it is possible to obtain an emission of fluorescence (maximum at 349 nm) which is progressively reduced (quenching) by the presence of increasing amounts of NAB815 (0.05-5 µM) until reaching a plateau (volume of the sample at the end of the experience 326 µl). NAB815 excited at the same wavelength does not determine a fluorescence emission. The emission results were corrected for the dilution of the concentration of the toxin due to the addition of the antibiotic calculated at each point by means of spectrophotometric evaluation. In the presence of NAB815 there was a maximum reduction of the emission by approximately 10%, at 1:1 toxin/NAB815 stoichiometric ratio and a dissociation constant (Kd) of the complex of $0.5 \times 10^{-8}$ M, indicating a significant affinity of the NAB815 for the Shiga toxin 2. The partial reduction of the emission (10%) can be explained with the interaction of the NAB815 with the A chain of the Shiga toxin 2. Indeed, the B pentamer contains 10 tryptophans (2 in each B subunit); hence, the quenching of one of these tryptophans in each one of the 5 B chains, caused by the NAB815, would have determined a much more significant reduction of the emission and a non-stoichiometric toxin/NAB815 ratio. Vice versa, the A chain only contains 2 tryptophans out of the 12 present in the holotoxin; therefore, a partial reduction of the fluorescence emission can be explained with the interaction of the NAB815 with the A chain of the Shiga toxin 2. The small mass of the NAB815 (Mw 1319.44)

compared to Shiga toxin 2 (Mw 68000) is in accordance with the quenching of one single tryptophan of the A chain. It should be pointed out that human cells such as the Raji cells (Burkitt lymphoma), which express the same receptor (Gb3Cer) interacting with the B chain pentamer of the Shiga toxins, as well as the in vivo target cells, are not protected by the NAB815 (FIG. 5). The intoxication was evaluated through the inhibition of the protein syntheses (measured in the presence of a radioactive amino acid; Arfilli et al., 2015 Toxins (Basel) 7, 4564-4576) obtained in Raji cells treated with different concentrations of Shiga toxin 2 in the presence and in the absence of NAB815 (0.3 μg/ml). As previously proved with polymyxin B (Carnicelli et al., 2016 J. Immunol. 196, 1177-1185), the NAB815 has no protective effect. To sum up, the NAB815, like polymyxin B, specifically inhibits TLR4/toxin interactions.

Example 3

This example proved that NAB815 blocks the functional consequences of the Shiga toxin 2/TLR4 interaction in human circulating cells.

Figure 6:
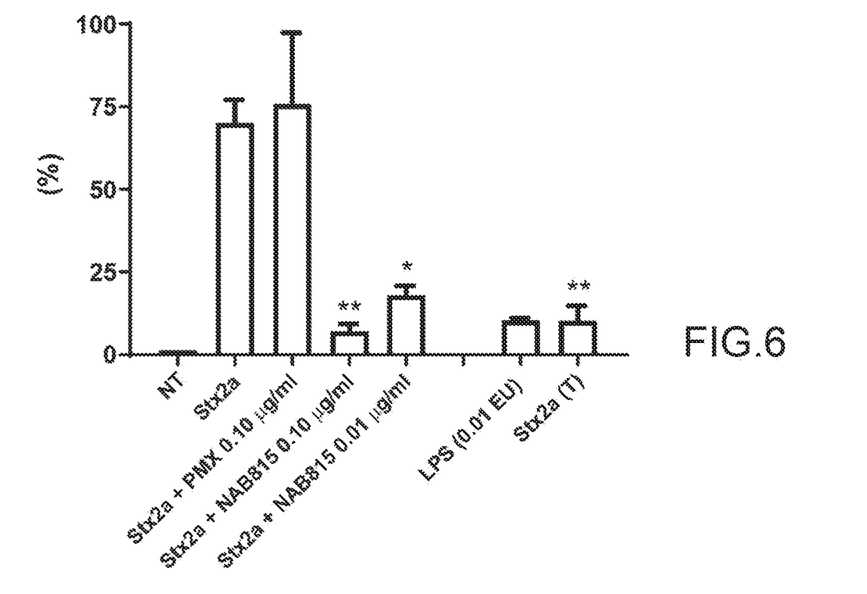
Figure 7:
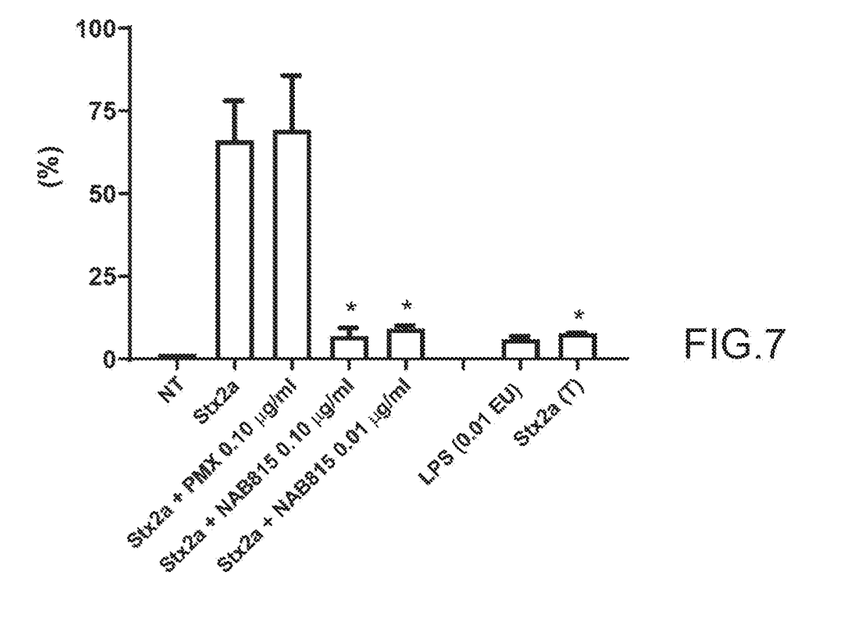
Figure 8:
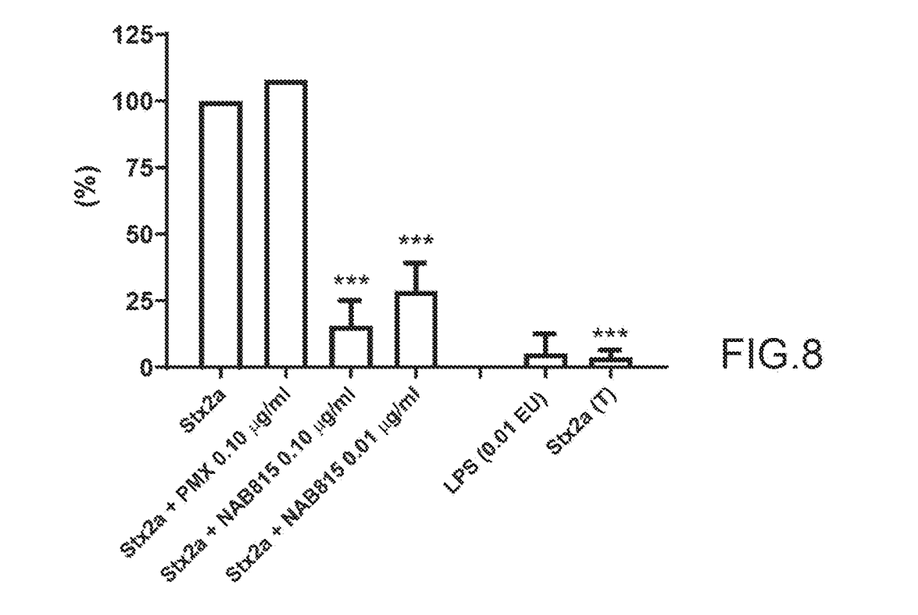
Figure 9:
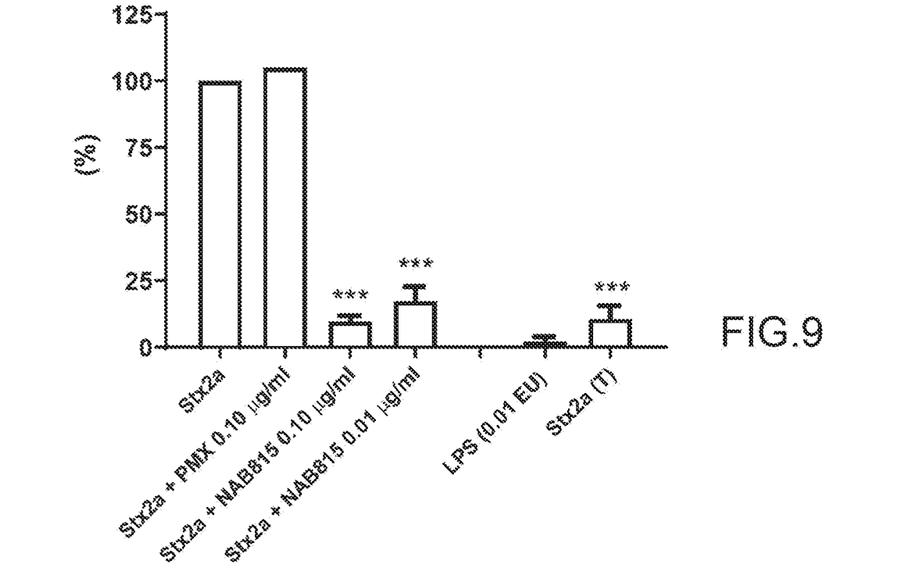

The most important effect of the NAB815 was obtained in the formation of white blood cell/platelet aggregates observed in patients during the early toxemic phase (before the development of the HUS), which are correlated with the formation of the extracellular vesicles involved in the development of the HUS. The formation of these aggregates was evaluated by direct fluorescence-based flow cytometry as previously described (Carnicelli et al., 2016 J. Immunol. 196, 1177-1185). In brief, non-fractionated blood samples (1 ml) of healthy donors were incubated for 4 h at 37° C. with Shiga toxin 2 (1 nM). After osmotic lysis of the erythrocytes, the samples were incubated with different fluorescent monoclonal antibodies (mAb): anti-CD41 marked with phycoerythrin (PE) to detect the platelets, anti-CD14 marked with FITC to detect the monocytes and anti-CD16 marked with phycoerythrin cyanine 5 (PC5) to detect the neutrophils, once the granular cells had been identified with the flow cytometer (gate). Furthermore, controls were carried out with the appropriate isotopic antibodies in order to exclude false positives. The cell populations showing a double CD14/CD41 positivity and the granular cell populations showing double CD16/CD41 positivity were identified as monocyte/platelet or neutrophil/platelet aggregates, respectively. FIGS. 6 to 9 show the effect of polymyxin B (PMX) and of NAB815 on the formation of neutrophil/platelet or monocyte/platelet aggregates in the human blood treated with Shiga toxin 2 (Stx2a). FIGS. 6 and 7 show the results obtained with the blood of a representative donor; more precisely, the number of aggregates formed is expressed as percentage relative to the total number of monocytes and neutrophils, respectively. FIGS. 8 and 9 show the results obtained with the blood of three different donors (data expressed as percentage of formed aggregates).

Also shown are the controls carried out for the presence of the sole contaminating bacterial endotoxin (LPS, 0.01 EU—hence, in the absence of Stx2a) in the preparation of the Shiga toxin 2, which does not determine any effect on the formation of the aggregates.

The formation of these aggregates must be attributed to the sole Shiga toxin 2, as pointed by the thermolability control (Stx2a (T)).

The inhibiting effect of the NAB815 on the formation of monocyte/platelet and neutrophil/platelet aggregates is evident (inhibition by more than 70%) even at very low concentrations 0.01 μg/ml (~7 fold molar excess relative to the Shiga toxin 2). In FIGS. 6 to 9, the effects of NAB815 and of polymyxin B at a 0.1 μg/ml concentration are compared: polymyxin B, unlike NAB815, is not effective.

The Sequence NO. 1 (i.e., Dab-Thr-DThr-cy[Dab-Dab-DPhe-Leu-Abu-Dab-Thr-]) corresponds to SEQ ID NO:1.

The Sequence NO. 2 (i.e., cy[Dab-Dab-DPhe-Leu-Dab-Dab-Thr-]) corresponds to SEQ ID NO:2.

The sequence R1-R10 of Polymyxin B (see Table 1 above) corresponds to SEQ ID NO:3.

The sequence R2-R10 of NAB7061 (see Table 1 above) corresponds to SEQ ID NO:4.

The sequence R2-R10 of NAB741 (see Table 1 above) corresponds to SEQ ID NO:5.

Sequence Listing (Free Text)

```
<210> 1
<211> 10
<212> PRT
<213> Artificial Sequence
<220>
<221> SITE
<222> 1
<223> Dab (2,4-diaminobutyryl)
<220>
<223> Synthesis carried out in a commercial automatized
synthesizer
<220>
<221> SITE
<222> 3
<223> D-Thr (this is a D amino acid)
<220>
<221> SITE
<222> 4
<223> Dab (2,4-diaminobutyryl)
<220>
<221> SITE
<222> 4, 10 <223> bound to each other
<220>
<221> SITE
<222> 5
<223> Dab (2,4-diaminobutyryl)
<220>
<221> SITE
<222> 6
<223> D-Phe (this is a D amino acid)
<220>
<221> SITE
<222> 8
<223> Abu (2-aminobutyryl)
<220>
<221> SITE
<222> 9
<223> Dab (2,4-diaminobutyryl)
<400> 1
Xaa Thr Thr Xaa Xaa Phe Leu Xaa Xaa Thr
1               5                   10

<210> 2
<211> 7
<212> PRT
<213> Artificial Sequence
<220>
<221> SITE
<222> 1
<223> Dab (2,4-diaminobutyryl)
<220>
<221> SITE
<222> 1, 7 <223> bound to each other
<220>
<223> Synthesis carried out in a commercial automatized
synthesizer
<220>
<221> SITE
<222> 2
<223> Dab (2,4-diaminobutyryl)
<220>
<221> SITE
<222> 3
<223> D-Phe (this is a D amino acid)
<220>
<221> SITE
<222> 5
<223> Dab (2,4-diaminobutyryl)
<220>
<221> SITE
<222> 6
<223> Dab (2,4-diaminobutyryl)
<400> 2
Xaa Xaa Phe Leu Xaa Xaa Thr
1               5
```

```
Sequence Listing (Free Text)

<210> 3
<211> 10
<212> PRT
<213> Artificial Sequence
<220>
<221> SITE
<222> 1
<223> Dab (2,4-diaminobutyryl)
<220>
<223> Synthesis carried out in a commercial automatized
synthesizer
<220>
<221> SITE
<222> 3
<223> Dab (2,4-diaminobutyryl)
<220>
<221> SITE
<222> 4
<223> Dab (2,4-diaminobutyryl)
<220>
<221> SITE
<222> 4, 10 <223> bound to each other
<220>
<221> SITE
<222> 5
<223> Dab (2,4-diaminobutyryl)
<220>
<221> SITE
<222> 6
<223> D-Phe (this is a D amino acid)
<220>
<221> SITE
<222> 8
<223> Dab (2,4-diaminobutyryl)
<220>
<221> SITE
<222> 9
<223> Dab (2,4-diaminobutyryl)
<400> 3
Xaa Thr Xaa Xaa Xaa Phe Leu Xaa Xaa Thr
1               5                   10

<210> 4
<211> 9
<212> PRT
<213> Artificial Sequence
<220>
<223> Synthesis carried out in a commercial automatized
synthesizer
<220>
<221> SITE
<222> 2
<223> Abu (2-aminobutyryl)
<220>
<221> SITE
<222> 3
<223> Dab (2,4-diaminobutyryl)
<220>
<221> SITE
<222> 3, 9 <223> bound to each other
<220>
<221> SITE
<222> 4
<223> Dab (2,4-diaminobutyryl)
<220>
<221> SITE
<222> 5
<223> D-Phe (this is a D amino acid)
<220>
<221> SITE
<222> 7
<223> Dab (2,4-diaminobutyryl)
<220>
<221> SITE
<222> 8
<223> Dab (2,4-diaminobutyryl)
<400> 4
Thr Xaa Xaa Xaa Phe Leu Xaa Xaa Thr
1               5

<210> 5
<211> 9
<212> PRT
<213> Artificial Sequence
<220>
<223> Synthesis carried out in a commercial automatized
synthesizer
<220>
<221> SITE
<222> 2
<223> D-Ser (this is a D amino acid)
<220>
<221> SITE
<222> 3
<223> Dab (2,4-diaminobutyryl)
<220>
<221> SITE
<222> 3, 9 <223> bound to each other
<220>
<221> SITE
<222> 4
<223> Dab (2,4-diaminobutyryl)
<220>
<221> SITE
<222> 5
<223> D-Phe (this is a D amino acid)
<220>
<221> SITE
<222> 7
<223> Dab (2,4-diaminobutyryl)
<220>
<221> SITE
<222> 8
<223> Dab (2,4-diaminobutyryl)
<400> 5
Thr Ser Xaa Xaa Phe Leu Xaa Xaa Thr
        1           5
```

SEQUENCE LISTING

```
<160> NUMBER OF SEQ ID NOS: 5

<210> SEQ ID NO 1
<211> LENGTH: 10
<212> TYPE: PRT
<213> ORGANISM: Artificial Sequence
<220> FEATURE:
<221> NAME/KEY: SITE
<222> LOCATION: 1
<223> OTHER INFORMATION: Dab (2,4-diaminobutyryl)
<220> FEATURE:
<223> OTHER INFORMATION: Synthesis carried out in a commercial
      automatized synthesizer
<220> FEATURE:
<221> NAME/KEY: SITE
<222> LOCATION: 3
<223> OTHER INFORMATION: D-Thr (this is a D amino acid)
<220> FEATURE:
<221> NAME/KEY: SITE
<222> LOCATION: 4
<223> OTHER INFORMATION: Dab (2,4-diaminobutyryl)
<220> FEATURE:
<221> NAME/KEY: SITE
<222> LOCATION: 4,10
<223> OTHER INFORMATION: bound to each other
<220> FEATURE:
<221> NAME/KEY: SITE
<222> LOCATION: 5
```

<223> OTHER INFORMATION: Dab (2,4-diaminobutyryl)
<220> FEATURE:
<221> NAME/KEY: SITE
<222> LOCATION: 6
<223> OTHER INFORMATION: D-Phe (this is a D amino acid)
<220> FEATURE:
<221> NAME/KEY: SITE
<222> LOCATION: 8
<223> OTHER INFORMATION: Abu (2-aminobutyryl)
<220> FEATURE:
<221> NAME/KEY: SITE
<222> LOCATION: 9
<223> OTHER INFORMATION: Dab (2,4-diaminobutyryl)

<400> SEQUENCE: 1

```
Xaa Thr Thr Xaa Xaa Phe Leu Xaa Xaa Thr
1               5                   10
```

<210> SEQ ID NO 2
<211> LENGTH: 7
<212> TYPE: PRT
<213> ORGANISM: Artificial Sequence
<220> FEATURE:
<221> NAME/KEY: SITE
<222> LOCATION: 1
<223> OTHER INFORMATION: Dab (2,4-diaminobutyryl)
<220> FEATURE:
<221> NAME/KEY: SITE
<222> LOCATION: 1,7
<223> OTHER INFORMATION: bound to each other
<220> FEATURE:
<223> OTHER INFORMATION: Synthesis carried out in a commercial automatized synthesizer
<220> FEATURE:
<221> NAME/KEY: SITE
<222> LOCATION: 2
<223> OTHER INFORMATION: Dab (2,4-diaminobutyryl)
<220> FEATURE:
<221> NAME/KEY: SITE
<222> LOCATION: 3
<223> OTHER INFORMATION: D-Phe (this is a D amino acid)
<220> FEATURE:
<221> NAME/KEY: SITE
<222> LOCATION: 5
<223> OTHER INFORMATION: Dab (2,4-diaminobutyryl)
<220> FEATURE:
<221> NAME/KEY: SITE
<222> LOCATION: 6
<223> OTHER INFORMATION: Dab (2,4-diaminobutyryl)

<400> SEQUENCE: 2

```
Xaa Xaa Phe Leu Xaa Xaa Thr
1               5
```

<210> SEQ ID NO 3
<211> LENGTH: 10
<212> TYPE: PRT
<213> ORGANISM: Artificial Sequence
<220> FEATURE:
<221> NAME/KEY: SITE
<222> LOCATION: 1
<223> OTHER INFORMATION: Dab (2,4-diaminobutyryl)
<220> FEATURE:
<223> OTHER INFORMATION: Synthesis carried out in a commercial automatized synthesizer
<220> FEATURE:
<221> NAME/KEY: SITE
<222> LOCATION: 3
<223> OTHER INFORMATION: Dab (2,4-diaminobutyryl)
<220> FEATURE:
<221> NAME/KEY: SITE
<222> LOCATION: 4
<223> OTHER INFORMATION: Dab (2,4-diaminobutyryl)
<220> FEATURE:
<221> NAME/KEY: SITE

```
<222> LOCATION: 4,10
<223> OTHER INFORMATION: bound to each other
<220> FEATURE:
<221> NAME/KEY: SITE
<222> LOCATION: 5
<223> OTHER INFORMATION: Dab (2,4-diaminobutyryl)
<220> FEATURE:
<221> NAME/KEY: SITE
<222> LOCATION: 6
<223> OTHER INFORMATION: D-Phe (this is a D amino acid)
<220> FEATURE:
<221> NAME/KEY: SITE
<222> LOCATION: 8
<223> OTHER INFORMATION: Dab (2,4-diaminobutyryl)
<220> FEATURE:
<221> NAME/KEY: SITE
<222> LOCATION: 9
<223> OTHER INFORMATION: Dab (2,4-diaminobutyryl)

<400> SEQUENCE: 3

Xaa Thr Xaa Xaa Xaa Phe Leu Xaa Xaa Thr
1               5                   10

<210> SEQ ID NO 4
<211> LENGTH: 9
<212> TYPE: PRT
<213> ORGANISM: Artificial Sequence
<220> FEATURE:
<223> OTHER INFORMATION: Synthesis carried out in a commercial
      automatized synthesizer
<220> FEATURE:
<221> NAME/KEY: SITE
<222> LOCATION: 2
<223> OTHER INFORMATION: Abu (2-aminobutyryl)
<220> FEATURE:
<221> NAME/KEY: SITE
<222> LOCATION: 3
<223> OTHER INFORMATION: Dab (2,4-diaminobutyryl)
<220> FEATURE:
<221> NAME/KEY: SITE
<222> LOCATION: 3,9
<223> OTHER INFORMATION: bound to each other
<220> FEATURE:
<221> NAME/KEY: SITE
<222> LOCATION: 4
<223> OTHER INFORMATION: Dab (2,4-diaminobutyryl)
<220> FEATURE:
<221> NAME/KEY: SITE
<222> LOCATION: 5
<223> OTHER INFORMATION: D-Phe (this is a D amino acid)
<220> FEATURE:
<221> NAME/KEY: SITE
<222> LOCATION: 7
<223> OTHER INFORMATION: Dab (2,4-diaminobutyryl)
<220> FEATURE:
<221> NAME/KEY: SITE
<222> LOCATION: 8
<223> OTHER INFORMATION: Dab (2,4-diaminobutyryl)

<400> SEQUENCE: 4

Thr Xaa Xaa Xaa Phe Leu Xaa Xaa Thr
1               5

<210> SEQ ID NO 5
<211> LENGTH: 9
<212> TYPE: PRT
<213> ORGANISM: Artificial Sequence
<220> FEATURE:
<223> OTHER INFORMATION: Synthesis carried out in a commercial
      automatized synthesizer
<220> FEATURE:
<221> NAME/KEY: SITE
<222> LOCATION: 2
<223> OTHER INFORMATION: D-Ser (this is a D amino acid)
<220> FEATURE:
```

```
<221> NAME/KEY: SITE
<222> LOCATION: 3
<223> OTHER INFORMATION: Dab (2,4-diaminobutyryl)
<220> FEATURE:
<221> NAME/KEY: SITE
<222> LOCATION: 3,9
<223> OTHER INFORMATION: bound to each other
<220> FEATURE:
<221> NAME/KEY: SITE
<222> LOCATION: 4
<223> OTHER INFORMATION: Dab (2,4-diaminobutyryl)
<220> FEATURE:
<221> NAME/KEY: SITE
<222> LOCATION: 5
<223> OTHER INFORMATION: D-Phe (this is a D amino acid)
<220> FEATURE:
<221> NAME/KEY: SITE
<222> LOCATION: 7
<223> OTHER INFORMATION: Dab (2,4-diaminobutyryl)
<220> FEATURE:
<221> NAME/KEY: SITE
<222> LOCATION: 8
<223> OTHER INFORMATION: Dab (2,4-diaminobutyryl)

<400> SEQUENCE: 5

Thr Ser Xaa Xaa Phe Leu Xaa Xaa Thr
1               5
```

The invention claimed is:

1. A method for the treatment and/or the prevention of the hemolytic-uremic syndrome in a mammal in need thereof; the method comprising administering a dose of a NAB815 compound or of a pharmaceutically acceptable salt thereof to the mammal;

the NAB815 compound having the following formula:

$$\begin{array}{c} \text{R7---R8} \\ \text{R6}\diagup\quad\diagdown\text{R9} \\ \text{R5}\diagdown\quad\diagup\text{R10} \\ \text{R4} \\ | \\ \text{R3} \\ | \\ \text{R2} \\ | \\ \text{R1} \\ | \\ \text{L} \end{array} \quad (\text{NAB815})$$

wherein: L is octanoyl (OA), R1 is -Dab, R2 is -Thr, R3 is -DThr, R4 is -Dab, R5 is -Dab, R6 is -DPhe, R7 is -Leu, R8 is -Abu, R9 is -Dab and R10 is -Thr, and wherein the dose is an effective amount to treat and/or prevent the hemolytic-uremic syndrome.

2. The method according to claim 1, wherein said mammal is a human being.

3. The method according to claim 1, wherein said method is for the treatment of the hemolytic-uremic syndrome.

4. A method for the treatment of a mammal having at least one Shiga 2 toxin in the blood within the circulatory system of the mammal; the method comprising administering a dose of a NAB815 compound or of a pharmaceutically acceptable salt thereof to the mammal; the NAB815 compound having the following formula:

$$\begin{array}{c} \text{R7---R8} \\ \text{R6}\diagup\quad\diagdown\text{R9} \\ \text{R5}\diagdown\quad\diagup\text{R10} \\ \text{R4} \\ | \\ \text{R3} \\ | \\ \text{R2} \\ | \\ \text{R1} \\ | \\ \text{L} \end{array} \quad (\text{NAB815})$$

wherein: wherein: L is octanoyl (OA), R1 is -Dab, R2 is -Thr, R3 is -DThr, R4 is -Dab, R5 is -Dab, R6 is -DPhe, R7 is -Leu, R8 is -Abu, R9 is -Dab and R10 is -Thr, and wherein the dose is an effective amount to block an interaction between the Shiga 2 toxin and TLR4.

5. The method according to claim 4, wherein the mammal is a human being.

6. The method according to claim 4, wherein said at least one Shiga toxin 2 is associated with white blood cells and/or platelets so as to form aggregates and/or extracellular vesicles in the blood within the circulatory system of the mammal.

* * * * *